(12) United States Patent
Duchi et al.

(10) Patent No.: US 7,136,772 B2
(45) Date of Patent: Nov. 14, 2006

(54) MONITORING SYSTEM FOR A COMMUNICATIONS NETWORK

(75) Inventors: Ceceli Duchi, Ft. Collins, CO (US); Robert Elsheimer, Ft. Collins, CO (US)

(73) Assignee: Avago Technologies Fiber IP (Singapore) Pte. Ltd. (SG)

( * ) Notice: Subject to any disclaimer, the term of this patent is extended or adjusted under 35 U.S.C. 154(b) by 778 days.

(21) Appl. No.: 10/291,259

(22) Filed: Nov. 8, 2002

(65) Prior Publication Data

US 2004/0091032 A1    May 13, 2004

(51) Int. Cl.
    *G06F 19/00*    (2006.01)
(52) U.S. Cl. .......................... 702/118; 714/26
(58) Field of Classification Search ............... 702/118, 702/188, 117; 709/224; 714/25, 26
    See application file for complete search history.

(56) References Cited

U.S. PATENT DOCUMENTS

| | | | |
|---|---|---|---|
| 3,881,099 A | 4/1975 | Allett et al. | |
| 4,974,184 A | 11/1990 | Avra | |
| 5,019,769 A | 5/1991 | Levinson | |
| 5,172,365 A | 12/1992 | Call et al. | |
| 5,396,059 A | 3/1995 | Yeates | |
| 5,812,572 A | 9/1998 | King et al. | |
| 5,818,797 A | 10/1998 | Watanabe et al. | |
| 6,012,152 A * | 1/2000 | Douik et al. | .................. 714/26 |
| 6,295,315 B1 | 9/2001 | Frisch et al. | |
| 6,310,911 B1 | 10/2001 | Burke et al. | |
| 6,996,202 B1 * | 2/2006 | McCormack et al. | ........ 375/355 |

FOREIGN PATENT DOCUMENTS

| | | |
|---|---|---|
| WO | WO 01/073465 | 4/2001 |
| WO | WO 01/69328 | 9/2001 |

OTHER PUBLICATIONS

International Engineering Consortium webpage: http://www.iec.org/online/tutorials/sonet; 2002; 2 pgs.
International Engineering Consortium tutorial entitled "Sychonous Opical Network (SONET)", 58 pgs.; 2002.
Article entitled "A Picosecond-Accuracey, 700-MHz Range, Si-Bipolar Time Interval Counter LSI"; Tai-ichi Otsuji, IEEE Journal of Solid-State Circuits, vol. 28, No. 9, Sep. 1993.
Murray R. Spiegel, Schaum's Outline Series/Probability and Statistics; Chapter 8, "Curve Fitting, Regression and Corrlation"; pp. 258-264; McGraw Hill Book Company 1975.

* cited by examiner

*Primary Examiner*—Edward Raymond

(57) ABSTRACT

A monitoring system for a communications network includes a set of components for transmitting and receiving data signals over the communications network. Each component includes a built-in self-test system for performing tests within the component and outputting corresponding test results. Each self-test system is configured to non-invasively determine waveform characteristics of the data signals. The system includes a set of processors. Each processor is coupled to a subset of the set of components, and is configured to evaluate the test results output by the components coupled to the processor. Each processor is configured to detect and predict faults in the communications network based on the evaluation of the test results.

19 Claims, 8 Drawing Sheets

MONITORING SYSTEM FOR A COMMUNICATIONS NETWORK

THE FIELD OF THE INVENTION

The present invention generally relates to communications networks, and more particularly to a monitoring system for a communications network.

BACKGROUND OF THE INVENTION

Prior art techniques for testing of communications networks generally fall into two categories: in-situ and ex-situ. Existing in-situ testing methods are either invasive or non-invasive. One invasive in-situ technique involves performing a precise bit error ratio (BER) test to assess gross functionality as well as parametric performance. Such a technique is described in International Publication No. WO 01/073465 A3 (International Application No. PCT/US01/09805), filed Mar. 26, 2001, published Oct. 4, 2001, and entitled "APPARATUS AND METHOD FOR BUILT-IN SELF-TEST OF A DATA COMMUNICATIONS SYSTEM." A problem with this technique is that it relies on sending and receiving known data, such as pseudorandom bit streams, to measure BER. Thus, the test is invasive since the normal operation of the communications link is interrupted.

Existing non-invasive in-situ techniques also involve measuring BER. Such non-invasive in-situ techniques are described in U.S. Pat. No. 6,310,911 B1, filed Feb. 11, 1998, issued Oct. 30, 2001, and entitled "METHOD OF DETECTING SIGNAL DEGRADATION FAULT CONDITIONS WITHIN SONET AND SDH SIGNALS," and the American National Standards Institute (ANSI) Synchronous Optical Network (SONET) standard (available from the International Engineering Consortium at http://www.iec.org/online/tutorials/sonet/). BER is measured by comparing the known bits in coding overhead to the values that arrive at a given receiver. If the received values deviate from the expected values, there are errors. A problem with this method of measuring BER is that it only provides an eye-center BER without reference to BER vs. phase (i.e. jitter). Any parametric measurements using BER vs. phase would be representative only of the performance of the clock recovery circuit, which would mask the performance of the optical link, where degradation is most likely.

Ex-situ techniques involve using test equipment hooked directly to a port being measured. The test equipment varies from limited, small, and inexpensive to large, expensive, and highly capable. The small, simple testers perform measurements ranging from BER and protocol analysis to optical time domain reflectometry (OTDR), but none of these testers measure alternating current (AC) waveform properties. The larger, more sophisticated test equipment category contains virtually every type of measurement capability, including measuring AC waveform quality, but can be quite expensive and cumbersome.

It would be desirable to provide a network monitoring system that is both ongoing (non-invasive) and precise to predict when a network component will fail.

SUMMARY OF THE INVENTION

One form of the present invention provides a monitoring system for a communications network. The monitoring system includes a set of components for transmitting and receiving data signals over the communications network. Each component includes a built-in self-test system for performing tests within the component and outputting corresponding test results. Each self-test system is configured to non-invasively determine waveform characteristics of the data signals. The system includes a set of processors. Each processor is coupled to a subset of the set of components, and is configured to evaluate the test results output by the components coupled to the processor. Each processor is configured to detect and predict faults in the communications network based on the evaluation of the test results.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
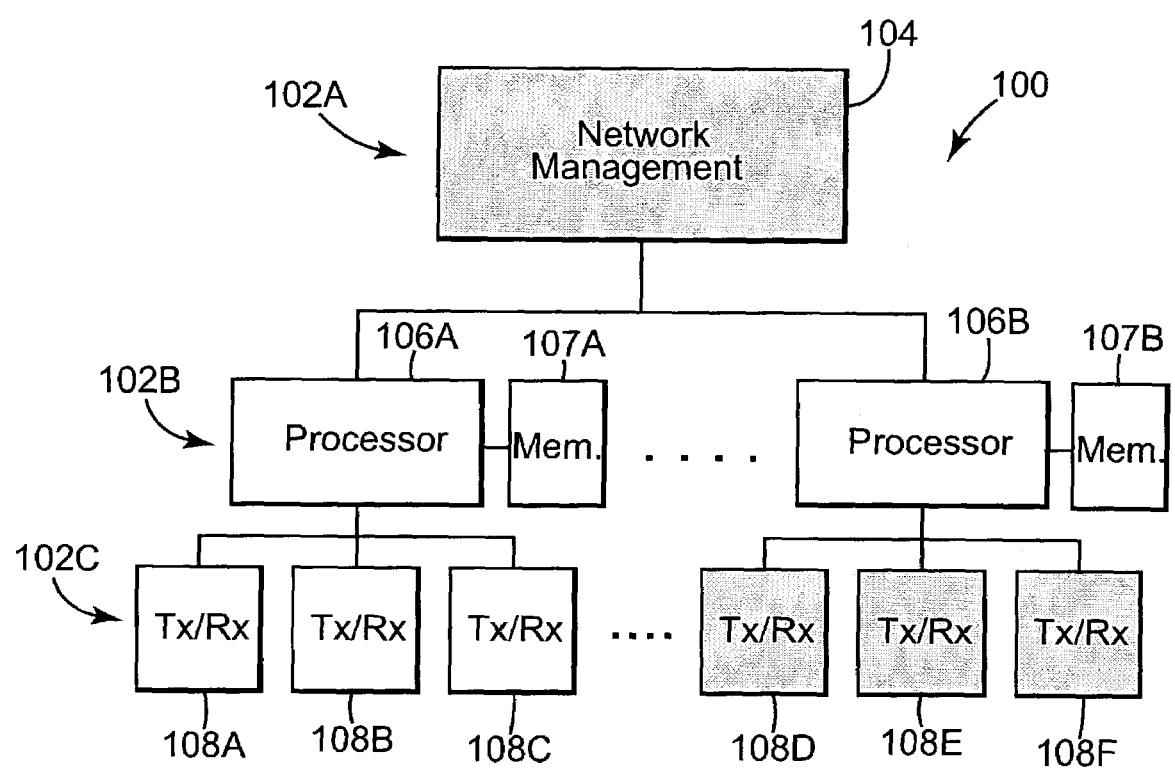
FIG. 1 is a block diagram illustrating a communications network according to one embodiment of the present invention.

FIG. 1 is a block diagram illustrating a communications network 100 according to one embodiment of the present invention. In one embodiment, communications network 100 includes non-invasive in-situ self-testing capabilities, as described in further detail below. In one form of the invention, communications network 100 is managed hierarchically, with the hierarchy including a top level 102A, an intermediate level 102B, and a bottom level 102C.

The bottom level 102C includes a set of components 108A–108F (collectively referred to as components 108) that transmit and/or receive data signals. Although the set of components 108 shown in FIG. 1 includes six components 108, in other embodiments, the set of components 108 may include any number of components 108, including a single component 108. In one embodiment, components 108 are fiber optic transmitter/receiver modules. In another embodiment, components 108 are transmit/receive integrated circuits for another type of media, such as copper. In one form of the invention, each component 108 is configured to execute one or more parametric self-tests, and thereby monitor and manage the performance of devices within the component 108, such as integrated circuits, photo-detectors, lasers, etc.

The intermediate level 102B of communications network 100 includes a set of processors 106A–106B (collectively referred to as processors 106), with each processor 106A–106B including an associated memory 107A–107B, respectively. Although the set of processors 106 shown in FIG. 1 includes two processors 106, in other embodiments, the set of processors 106 may include any number of processors 106, including a single processor 106. Each processor 106 is communicatively coupled to a subset of the components 108. As shown in FIG. 1, processor 106A is coupled to components 108A–108C, and processor 106B is coupled to components 108D–108F.

After executing one or more self-tests, components 108 send test results from the individual tests to one of the processors 106 for evaluation. Processors 106 are configured to collect and evaluate test data from several components 108 in parallel, and provide reports to the next level 102A in the hierarchy. In one embodiment, each component 108 that is managed by a processor 106 is uniquely addressable, which allows the processor 106 to associate received test results with a particular one of the components 108. In one form of the invention, processors 106 also perform test control operations including causing one or more components 108 to begin execution of various self-tests.

The top level 102A of communications network 100 includes a network management block 104. In one embodiment, network management block 104 includes network management software running on one or more computers. The network management architecture for communications networks is highly application specific, and FIG. 1 is meant to illustrate one embodiment of such an architecture. In alternative embodiments, there may be several layers of management hierarchy below the top level 102A that is accessible to a network operator. A goal of one embodiment of the invention is to provide useful information to the network operator regarding when certain parts of the network 100 will require preventative maintenance. In one form of the invention, if a problem is found with present (measured) or future (calculated) performance at the component level 102C, one of the processors 106 raises a flag that eventually propagates to the network operator at the top level 102A. Network management block 104 provides a network operator interface for providing high-level test results that may be used to trigger preventative maintenance.

Figure 2:
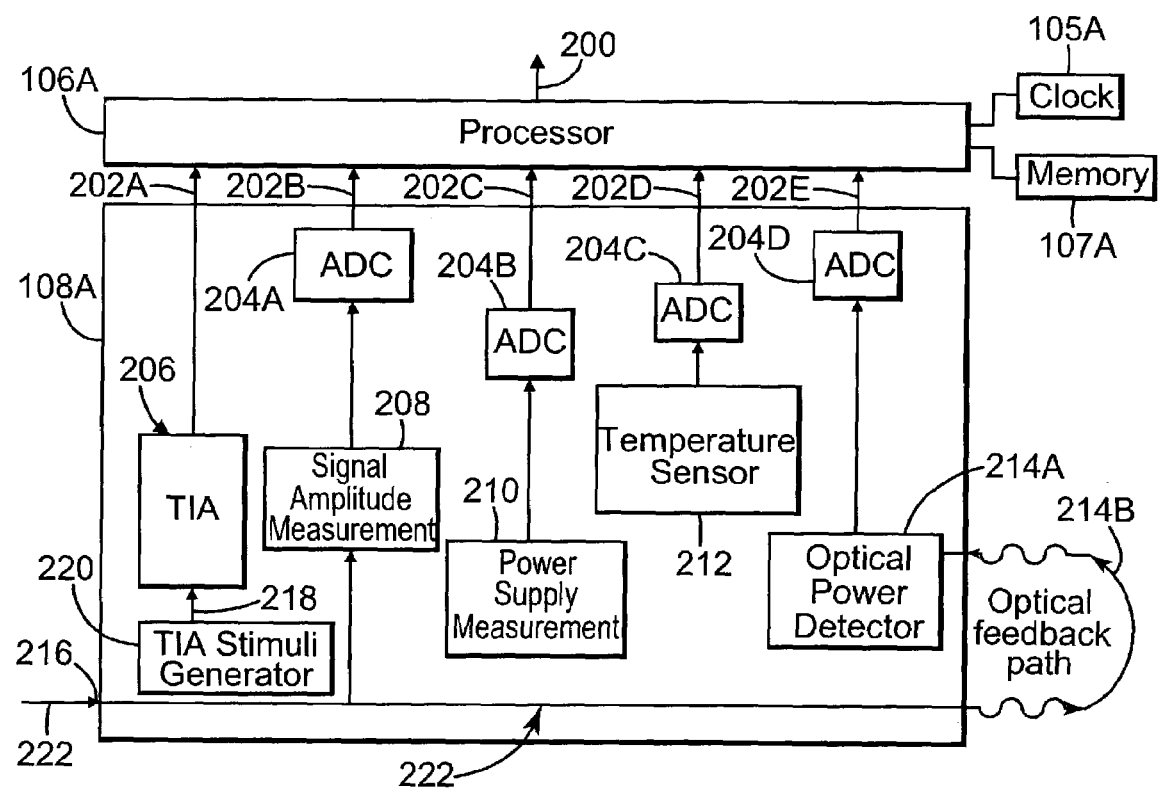
FIG. 2 is a block diagram illustrating self-test elements in one of the components shown in FIG. 1 according to one embodiment of the present invention.

One embodiment of the present invention is directed to the bottom two layers 102B and 102C shown in FIG. 1. FIG. 2 is a block diagram illustrating self-test elements in one of the components 108 shown in FIG. 1 according to one embodiment of the present invention. Also shown in FIG. 2 are clock 105A, processor 106A, and memory 107A. In one embodiment, the other components 108 and processors 106 (shown in FIG. 1) in network 100 are configured in substantially the same manner as shown in FIG. 2.

As shown in FIG. 2, component 108A includes signal amplitude analog-to-digital converter (ADC) 204A, power supply analog-to-digital converter 204B, temperature analog-to-digital converter 204C, optical power analog-to-digital converter 204D, time interval analyzer (TIA) 206, signal amplitude measurement block 208, power supply measurement block 210, temperature sensor 212, optical power detector 214A, optical feedback path 214B, and TIA stimuli generator 220.

Component 108A includes an input 216 for receiving a data signal 222. TIA stimuli generator 220 and time interval analyzer 206 include circuits for monitoring AC waveform properties (e.g., random and deterministic jitter, rise/fall times, pulse width, duty-cycle distortion, and inter-channel skew) of data signal 222. Time interval analyzer 206 outputs AC waveform property data to processor 106A via communication link 202A.

Signal amplitude measurement block 208 includes circuits for measuring signal amplitude of data signal 222. Signal amplitude measurement block 208 outputs analog signal amplitude information to analog-to-digital converter 204A, which converts the analog information into digital values. Analog-to-digital converter 204A outputs digital signal amplitude information to processor 106A via communication link 202B.

Power supply measurement block 210 includes circuits for monitoring a power supply (not shown) of component 108A. Power supply measurement block 210 outputs analog power supply information to analog-to-digital converter 204B, which converts the analog information into digital values. Analog-to-digital converter 204B outputs digital power supply information to processor 106A via communication link 202C.

Temperature sensor 212 measures the temperature within component 108A. Temperature sensor 212 outputs analog temperature information to analog-to-digital converter 204C, which converts the analog information into digital values. Analog-to-digital converter 204C outputs digital temperature information to processor 106A via communication link 202D.

Optical power detector 214A measures the average optical power of data signal 222. Optical power detector 214A outputs analog average optical power information to analog-to-digital converter 204D, which converts the analog information into digital values. Analog-to-digital converter 204D outputs digital average optical power information to processor 106A via communication link 202E.

In one embodiment, processor 106A continuously collects, stores, and processes the test data received on communication links 202A–202E (collectively referred to as communication links 202) in order to assess present and future link performance, and outputs existing and predicted fault indications via communication link 200. Processor 106A stores test data in memory 107A. In one embodiment, the test data received on links 202 are time-stamped by processor 106A, based on a time value provided by clock 105A.

In one form of the invention, each transmit/receive component 108 is implemented as a single electronic chip, and the blocks 204–220 shown in FIG. 2 are implemented on-board the electronic chip. Each of the self-test elements 206 and 220, 208, 210, 212, and 214A, shown in FIG. 2 is described in further detail below with reference to FIGS. 3A to 9, followed by a more detailed description of data processing functions performed by processor 106A according to one embodiment of the present invention.

In one embodiment, AC waveform properties of data signal 222 are measured with on-board time interval analyzer 206. The use of a time interval analyzer 206 enables non-invasive testing, since it serves as a probe to the signal path 222 rather than a detour. Since time interval analyzer 206 uses a direct connection to the signal path 222 in one embodiment, careful analog design is important. In one form of the invention, time interval analyzer 206 samples the waveform features of interest at a rate slower than the data 222 itself. Time interval analyzer 206 measures the time between two events called "start" and "stop" signals 218, which are generated by TIA stimuli generator 220 from two edges of the data 222 whose time separation is being measured. By continuously sampling time intervals, time interval analyzer 206 builds a sampled time-domain picture of the data signal 222.

There are many existing on-chip time-interval-analysis systems that measure the time between two user-generated stimuli, and that would be suitable for use in implementing one embodiment of time interval analyzer 206. Such existing systems are described in the following references: U.S. Pat. No. 6,310,911 B1, filed Feb. 11, 1998, issued Oct. 30, 2001, and entitled "METHOD OF DETECTING SIGNAL DEGRADATION FAULT CONDITIONS WITHIN SONET AND SDH SIGNALS;" Otsuji, "A Picosecond-Accuracy, 700 MHz Range, Si-Bipolar Time Interval Counter LSI," IEEE Journal of Solid State Circuits, Vol. 28 No. 9, pp. 941–947; and U.S. Pat. No. 6,295,315 B1, filed Apr. 20, 1999, issued Sep. 25, 2001, and entitled "JITTER MEASUREMENT SYSTEM AND METHOD."

The output of the time interval analyzer 206 is digital timing measurement data that is provided to processor 106A via communication link 202A. Processor 106A stores and tabulates the received timing measurement data.

Figure 3A:
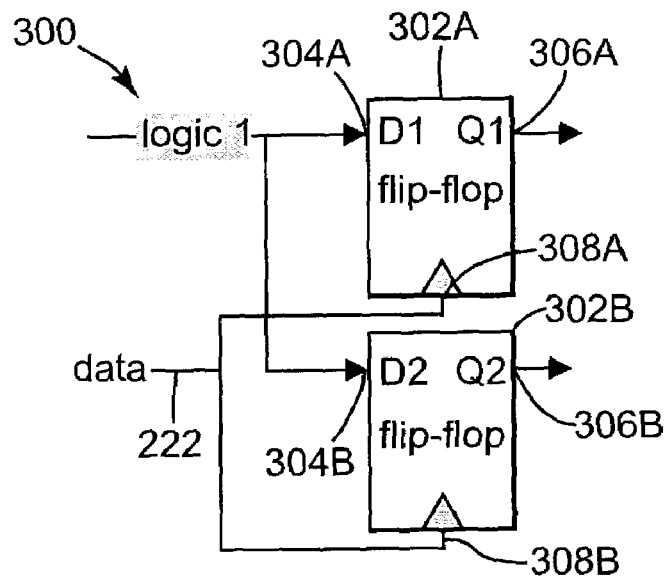
FIG. 3A is block diagram illustrating a circuit that is part of the TIA stimuli generator shown in FIG. 2, and that generates stimuli for measuring pulse widths of the data signal according to one embodiment of the present invention.

FIGS. 3A–7 are diagrams illustrating the generation of stimuli signals 218 by TIA stimuli generator 220, which are used by time interval analyzer 206 to perform various timing measurements. FIG. 3A is block diagram illustrating a circuit 300 that is part of the TIA stimuli generator 220, and that generates stimuli 218 for measuring pulse widths of data signal 222 according to one embodiment of the present invention. FIG. 3B is a timing diagram illustrating a data signal 222, and start 218A and stop 218B signals (collectively referred to as stimuli signals 218) generated by the circuit 300 shown in FIG. 3A according to one embodiment of the present invention.

The start 218A and stop 218B signals are generated from the rising and falling edges, respectively, of data signal 222. The time difference between the start 218A and stop 218B signals is equal to the time interval being measured. As shown in FIG. 3A, the start 218A and stop 218B signals are generated with flip-flops 302A and 302B, respectively. In one embodiment, flip-flop 302A is a positive-edge-triggered D-type flip-flop, and flip-flop 302B is a negative-edge-triggered D-type flip-flop. Flip-flop 302A includes D1 input 304A, clock input 308A, and Q1 output 306A. Flip-flop 302B includes D2 input 304B, clock input 308B, and Q1 output 306B. Data signal 222 is coupled to the clock inputs 308A and 308B, and a logic "1" is coupled to the inputs 304A and 304B.

Figure 3B:
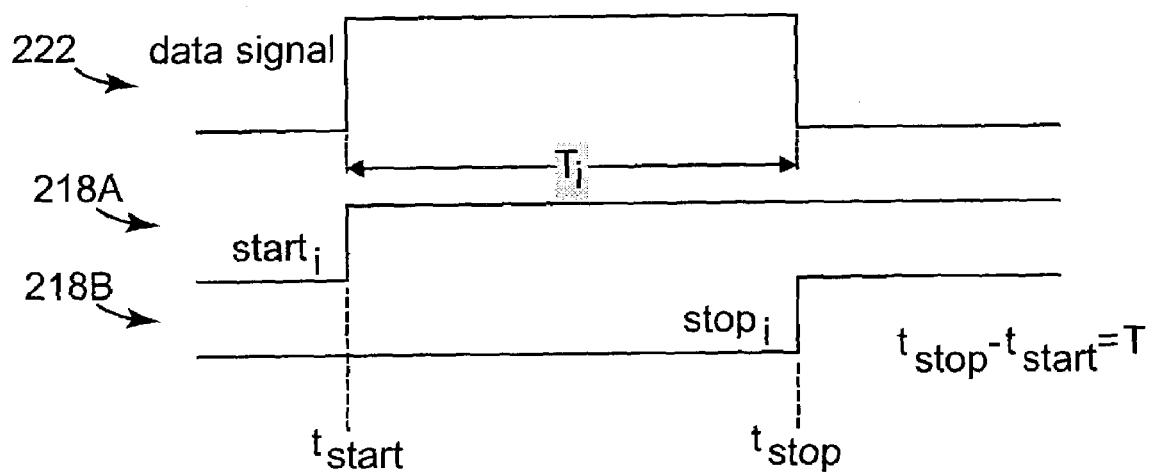
FIG. 3B is a timing diagram illustrating a data signal, and start and stop signals generated by the circuit shown in FIG. 3A according to one embodiment of the present invention.

When a rising edge in the data 222 arrives, the output 306A of flip-flop 302A goes from a logic "0" to a logic "1", generating the start signal 218A as shown in FIG. 3B. When a falling edge in the data 222 arrives, the output 306B of flip-flop 302B goes from a logic "0" to a logic "1", generating the stop signal 218B as shown in FIG. 3B. The pulse width (T) is determined by the difference between the time ($t_{stop}$) that stop signal 218B is generated and the time ($t_{start}$) that start signal 218A is generated (i.e., $T=t_{stop}-t_{start}$). The pulse width measurement may be repeated as many times as desired, and each set of start 218A and stop 218B signals and the corresponding pulse width, T, are identified with the index "i" (i.e., $start_i$, $stop_i$, and $T_i$).

Figure 4A:
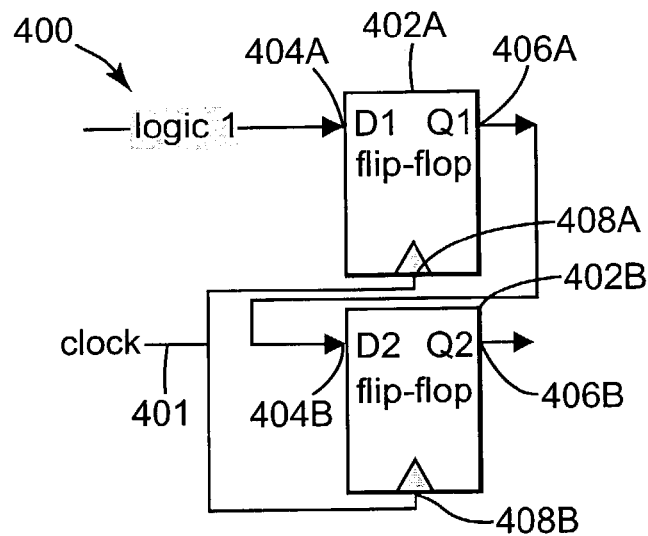
FIG. 4A is block diagram illustrating a circuit that is part of the TIA stimuli generator shown in FIG. 2, and that generates stimuli for measuring period jitter of a clock signal according to one embodiment of the present invention.

FIG. 4A is block diagram illustrating a circuit 400 that is part of the TIA stimuli generator 220, and that generates stimuli signals 218 for measuring period jitter of a clock signal 401 according to one embodiment of the present invention. In one embodiment, TIA stimuli generator 220 includes a phase lock loop (not shown) for generating clock signal 401 from data signal 222. In one embodiment, period jitter in clock signal 401 is measured by generating start and stop signals 218A and 218B using two flip-flops 402A and 402B in a manner similar to that described above with reference to FIGS. 3A and 3B. However, rather than using a positive-edge-triggered flip-flop and a negative-edge-triggered flip-flop as described above with reference to FIG. 3A, both of the flip-flops 402A and 402B in FIG. 4A are positive-edge-triggered flip-flops.

Flip-flop 402A includes D1 input 404A, clock input 408A, and Q1 output 406A. Flip-flop 402B includes D2 input 404B, clock input 408B, and Q1 output 406B. Clock signal 401 is coupled to the clock inputs 408A and 408B, a logic "1" is coupled to input 404A, and input 404B is coupled to the output 406A of flip-flop 402A.

Figure 4B:
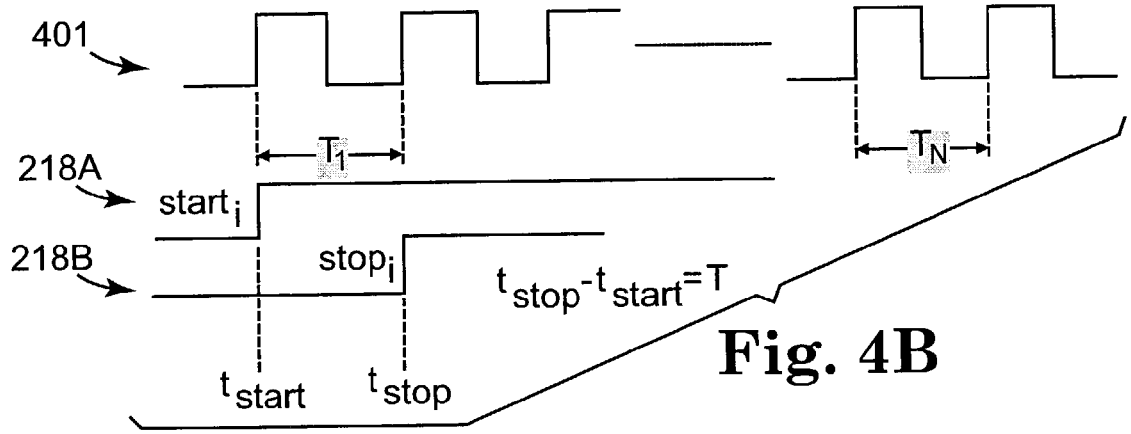
FIG. 4B is a timing diagram illustrating a clock signal, and start and stop signals generated by the circuit shown in FIG. 4A according to one embodiment of the present invention.

FIG. 4B is a timing diagram illustrating clock signal 401, and start 218A and stop 218B signals generated by the circuit 400 shown in FIG. 4A according to one embodiment of the present invention. When a first rising edge in the clock signal 401 arrives, the output 406A of flip-flop 402A goes from a logic "0" to a logic "1", generating the start signal 218A as shown in FIG. 4B. When a second rising edge in the clock signal 401 arrives, the output 406B of flip-flop 402B goes from a logic "0" to a logic "1", generating the stop signal 218B as shown in FIG. 4B . The clock period (T) is determined by the difference between the time ($t_{stop}$) that stop signal 218B is generated and the time ($t_{start}$) that start signal 218A is generated (i.e., $T=t_{stop}-t_{start}$). In one embodiment, clock periods are measured repeatedly, and each set of start 218A and stop 218B signals and the corresponding clock period, T, are identified with the index "i" (i.e., start$_i$, stop$_i$, and T$_i$), where "i" ranges from 1 to a final value, N. FIG. 4A shows the measurement of a first clock period T$_1$ (i.e., i=1) and a final clock period T$_N$ (i.e., i=N). Many more clock periods T$_i$ may be measured between T$_1$ and T$_N$. In one embodiment, the measured clock periods are stored in a histogram (e.g., histogram 420 shown in FIG. 4C) from which random and peak-to-peak jitter are calculated.

Figure 4C:
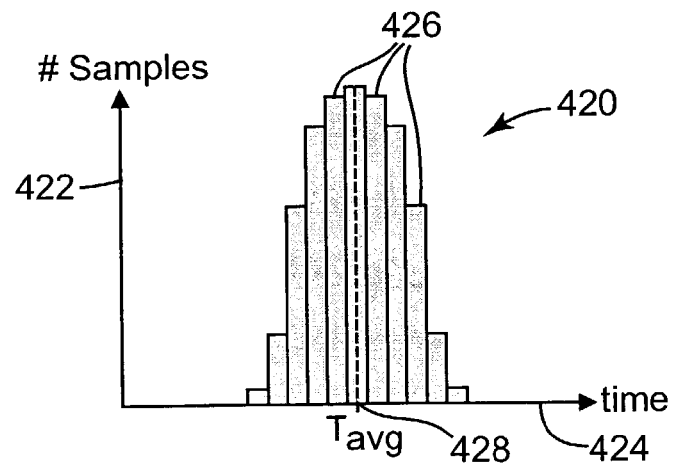
FIG. 4C is a diagram illustrating an example histogram generated from clock period measurements according to one embodiment of the present invention.

FIG. 4C is a diagram illustrating an example histogram 420 generated from clock period measurements according to one embodiment of the present invention. The histogram 420 includes a vertical axis 422 that represents a number of samples (i.e., a number of clock period measurements), and a horizontal axis 424 that represents time. The histogram 420 includes a set of bars 426 illustrating a time distribution of the measured clock periods. Also shown in FIG. 4C is an average clock period (T$_{avg}$), which represents an average of all of the measured clock periods. In one embodiment, random and peak-to-peak jitter are calculated from histogram 420.

Figure 5A:
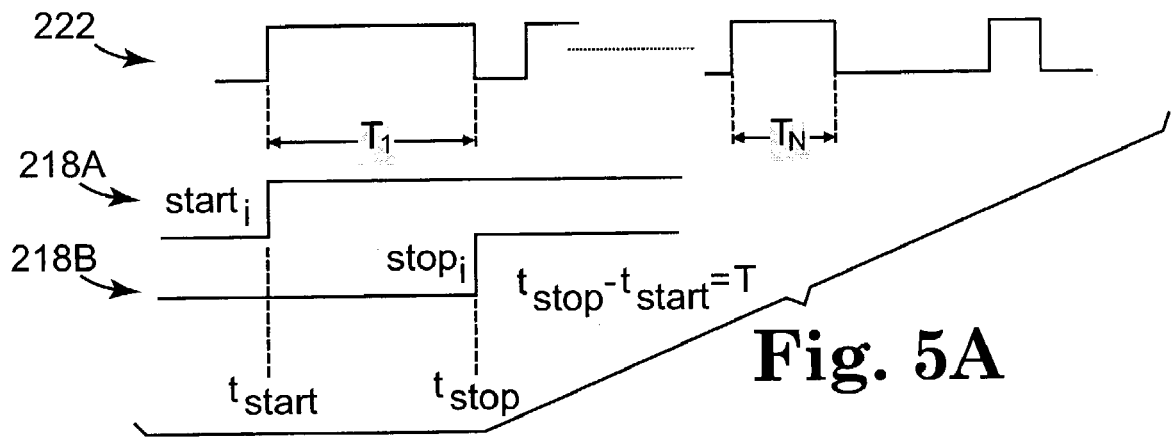
FIG. 5A is a timing diagram illustrating a data signal, and start and stop signals generated by the circuit shown in FIG. 3A, which are used to determine the jitter in the data signal according to one embodiment of the present invention.

In one embodiment, in addition to measuring jitter in a clock signal, jitter is also measured for data signal 222. FIG. 5A is a timing diagram illustrating data signal 222, and start 218A and stop 218B signals generated by circuit 300 (shown in FIG. 3A), which are used to determine jitter in data signal 222 according to one embodiment of the present invention. In the illustrated embodiment, data signal 222 is a non-return-to-zero (NRZ) signal. The pulse width (T) of pulses in data signal 222 are measured as described above with reference to FIGS. 3A and 3B. In one embodiment, each set of start 218A and stop 218B signals and the corresponding pulse width, T, are identified with the index "i" (i.e., start$_i$, stop$_i$, and T$_i$), where "i" ranges from 1 to a final value, N. FIG. 5A shows the measurement of a first pulse width T$_1$ (i.e., i=1) and a final pulse width T$_N$ (i.e., i=N). Many more pulse widths T$_i$ may be measured between T$_1$ and T$_N$. In one embodiment, the measured pulse widths are stored in a histogram (e.g., histogram 520 shown in FIG. 5B) from which jitter information is calculated.

Figure 5B:
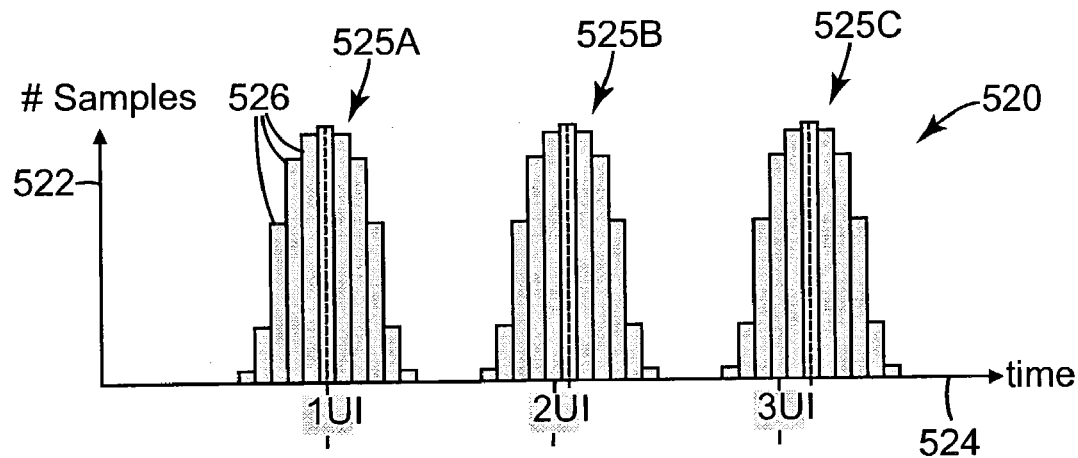
FIG. 5B is a diagram illustrating an example histogram generated from pulse width measurements according to one embodiment of the present invention.

FIG. 5B is a diagram illustrating an example histogram 520 generated from pulse width measurements on a non-return-to-zero (NRZ) data stream, as opposed to a clock, according to one embodiment of the present invention. The histogram 520 includes a vertical axis 522 that represents a number of samples (i.e., a number of pulse width measurements), and a horizontal axis 524 that represents time. The histogram 520 includes three sets 525A–525C of bars 526 illustrating a time distribution of the measured pulse widths. As shown in FIG. 5B, the first set 525A of bars 526 are centered about a time corresponding to one unit interval (UI), the second set 525B of bars 526 are centered about a time that is slightly offset from two UI, and the third set 525C of bars 526 are centered about a time that is offset from three UI.

Figure 5C:
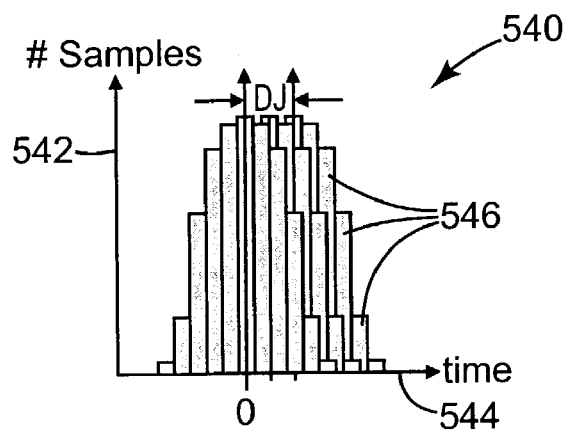
FIG. 5C is a diagram illustrating an example histogram generated from normalized pulse width measurements according to one embodiment of the present invention.

FIG. 5C is a diagram illustrating an example histogram 540 generated from normalized pulse width measurements according to one embodiment of the present invention. Histogram 540 includes a vertical axis 542 that represents a number of samples (i.e., a number of pulse width measurements), and a horizontal axis 544 that represents time. The histogram 540 includes a set of bars 546 illustrating a time distribution of the measured pulse widths. Histogram 540 is generated by essentially superimposing the three sets 525A–525C of bars 526 shown in FIG. 5B on top of each other. More specifically, the measured pulse widths will all occur within a window of N-unit intervals plus or minus half of a UI. With this prior knowledge, the pulse width data can be normalized by subtracting the corresponding number of unit intervals from a given measurement. For example, if a system has data whose unit interval is 400 picoseconds (ps) and a measured pulse width is 1390 ps, this measurement would be normalized by subtracting 3 UI, or 1200 ps, and the remaining value of 190 ps would be plotted. If the measured value had been 1410 ps, 4 UI would be subtracted and a point would be plotted at −190 ps. As shown in FIG. 5C, the time difference between peaks of the histogram 540 are indicative of deterministic jitter (DJ).

Figure 6:
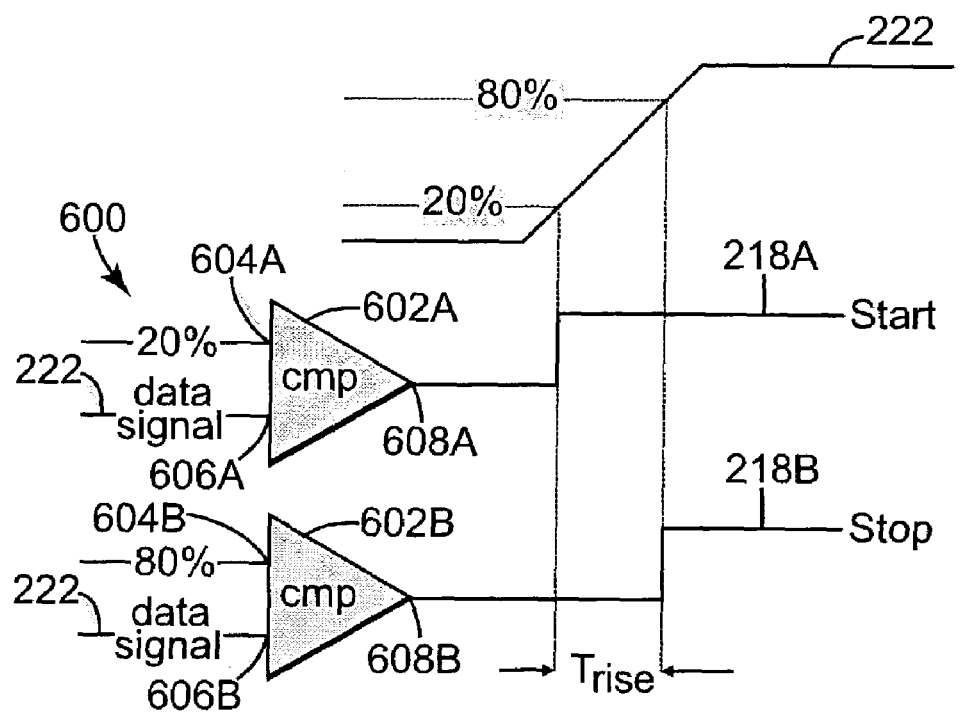
FIG. 6 is a combined block diagram and timing diagram illustrating a circuit that is part of the TIA stimuli generator shown in FIG. 2, and that generates start and stop signals for measuring the rise time of a data signal according to one embodiment of the present invention.

FIG. 6 is a combined block diagram and timing diagram illustrating a circuit 600 that is part of the TIA stimuli generator 220, and that generates start 218A and stop 218B signals for measuring the rise time of data signal 222 according to one embodiment of the present invention. Circuit 600 includes comparators 602A and 602B with preset thresholds. Comparator 602A includes inputs 604A and 606A, and output 608A. Comparator 602B includes inputs 604B and 606B, and output 608B. In one embodiment, input 604A is set to a value corresponding to 20% of the peak-to-peak value of data signal 222, and input 604B is set to a value corresponding to 80% of the peak-to-peak value of data signal 222. Inputs 606A and 606B are coupled to data signal 222. When the incoming data signal 222 is greater than 20% of the peak-to-peak signal, the output 608A of comparator 602A toggles from low to high, thereby generating start signal 218A. When the incoming data signal 222 is greater than 80% of the peak-to-peak signal, the output 608B of comparator 602B toggles from low to high, thereby generating stop signal 218B. The rise time (T$_{rise}$) is calculated by determining the difference between the time that the stop signal 218B was generated and the time that the start signal 218A was generated. The on-chip determination of the peak-to-peak swing, from which the 20% and 80% levels are generated, is described in further detail below with reference to FIG. 8. For measuring fall time, the 20% and 80% inputs 604A and 604B, respectively, are reversed.

Figure 7:
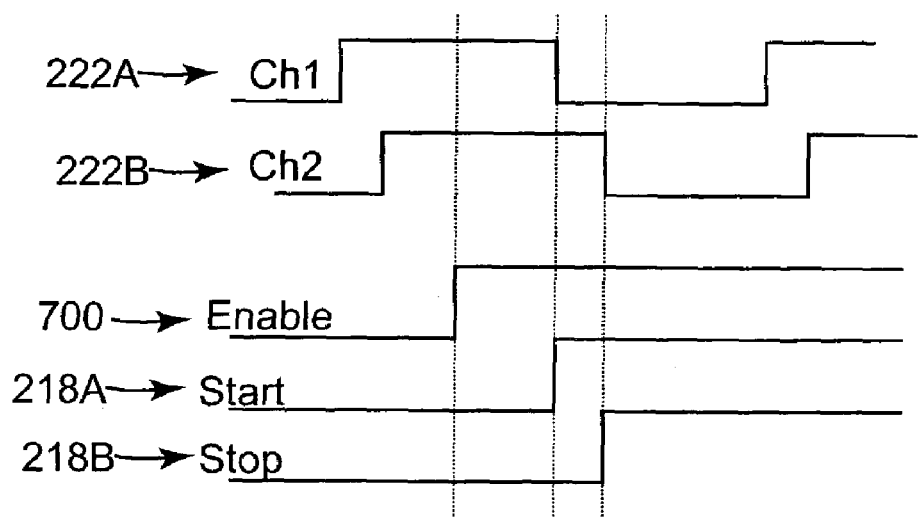
FIG. 7 is a timing diagram illustrating two data signal channels, and start and stop signals generated by the TIA stimuli generator shown in FIG. 2 for measuring inter-channel skew according to one embodiment of the present invention.

FIG. 7 is a timing diagram illustrating two data signal channels 222A and 222B, and start 218A and stop 218B signals generated by TIA stimuli generator 220 for measuring inter-channel skew according to one embodiment of the present invention. In one embodiment, start signal 218A is generated with a first negative-edge-triggered D-type flip-flop coupled to the first data signal channel (Ch1) 222A, and stop signal 218B is generated with a second negative-edge-triggered D-type flip-flop coupled to the second data signal channel (Ch2) 222B. Thus, the Ch1 and Ch2 data edges are used to provide the start and stop signals 218A and 218B, which are allowed to pass into time interval analyzer 206 when enable signal 700 is a logic high. The inter-channel skew is defined as the time between corresponding data edges on the two channels 222A and 222B.

Figure 8:
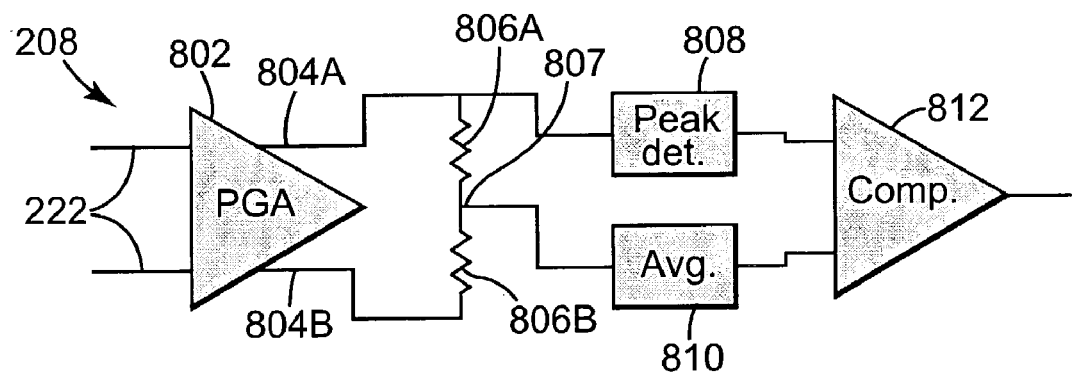
FIG. 8 is an electrical schematic/block diagram illustrating a signal amplitude measurement circuit according to one embodiment of the present invention.

FIG. 8 is an electrical schematic/block diagram illustrating a signal amplitude measurement circuit 208 (shown in block form in FIG. 2) according to one embodiment of the present invention. Circuit 208 includes programmable gain amplifier (PGA) 802, resistors 806A and 806B, peak detector 808, averaging circuit 810, and comparator 812.

In one embodiment, data signal 222 is a differential signal that is input to programmable gain amplifier 802. This gain of amplifier 802 is programmed so that the output signals are compatible with the analog-to-digital converter 204A (shown in FIG. 2) coupled to the output of circuit 208 (i.e., to the output of comparator 812). The amplifier outputs 804A and 804B are coupled together with a pair of matched, high-value resistors 806A and 806B (e.g., 100 K ohms each). The outputs 804A and 804B are differential and, thus, are complimentary about a certain offset voltage. The midpoint 807 of the two resistors 806A and 806B is steady (i.e., has little or no AC content) and is equal to the average of the two outputs 804A and 804B.

The voltage at the midpoint 807 is fed through averaging circuit 810 for further smoothing. In one embodiment, averaging circuit 810 is a conventional circuit available in circuit design textbooks. Output 804A of amplifier 802 is used single-endedly as the input to peak detector 808 whose function is to retain the highest seen voltage, or peak, at its output. In one embodiment, peak detector 808 is also a conventional circuit available in circuit design textbooks. The peak signal output from peak detector 808 and the average signal output from averaging circuit 810 are fed into comparator 812, whose output is proportional to the difference in the inputs (i.e., the output is an analog voltage proportional to half of the total signal swing). The analog output of the comparator 812 is converted to a number (representing one half of the peak-to-peak signal amplitude) by analog-to-digital converter 204A (shown in FIG. 2) before going to the processor 106A (shown in FIG. 2).

Figure 9:
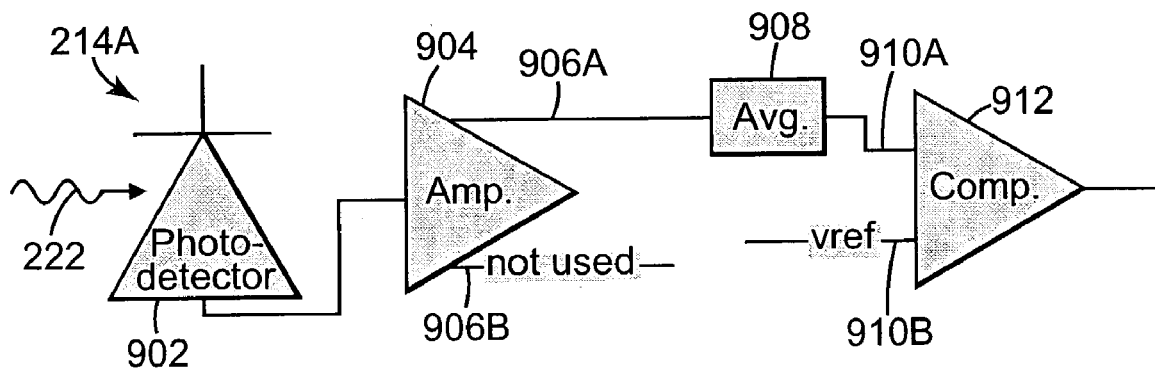
FIG. 9 is an electrical schematic/block diagram illustrating an optical power detector circuit for measuring average optical power according to one embodiment of the present invention.

FIG. 9 is an electrical schematic/block diagram illustrating an optical power detector circuit 214A (shown in block form in FIG. 2) for measuring average optical power according to one embodiment of the present invention. Circuit 214A includes a photo detector (e.g., photo diode) 902, transimpedance amplifier 904, averaging circuit 908, and comparator 912. The test for average optical power can be carried out in one of two ways: (1) if component 108A is an optical transmitter, component 108A can test itself via an internal optical feedback path 214B (shown in FIG. 2); (2) if component 108A is an optical receiver, component 108A can test the transmitter at the other end of the link (i.e. loopback or point-to-point). The circuitry for each of these two methods is essentially the same, and is shown in FIG. 9.

As shown in FIG. 9, optical signal 222 from a transmitter is incident on photo detector 902 and produces a small photocurrent. This (single-ended) photocurrent is fed into transimpedance amplifier 904, which includes differential outputs 906A and 906B. In one embodiment, output 906B is not used. Output 906A of amplifier 904 goes through an averaging stage 908. In one embodiment, averaging stage 908 is a conventional circuit available in circuit design textbooks. The output of the averaging stage 908 is fed to an input 910A of comparator 912. The other input 910B of comparator 912 is coupled to a reference voltage (vref). Comparator 912 compares the output of the averaging stage 908 with the reference voltage (vref), and amplifies the difference between the two voltages. The analog output of the comparator 912 is converted to a number (representing the average optical power) by analog-to-digital converter 204D (shown in FIG. 2) before going to the processor 106A (shown in FIG. 2).

In one embodiment, power supply measurement circuit 210 and temperature sensor 212 (both shown in block form in FIG. 2) are implemented with conventional circuits that are known to persons of ordinary skill in the art, and are, therefore, not illustrated in additional detail. In one embodiment, temperature sensor 212 is implemented with an on-chip, forward-biased p-n junction diode being driven by a current source. The voltage measured on the cathode (assuming that the anode is at ground) will increase with decreasing temperature because the material bandgap increases, decreasing the free carrier concentrations in the saturation current term of the diode equation. Thus, the constant bias current corresponds to a higher voltage, the lower the temperature. This voltage, once calibrated to a direct on-chip temperature measurement, is then fed into analog-to-digital converter 204C (shown in FIG. 2) before going to the processor 106A.

In one embodiment, since the various measurement blocks 206, 208, 210, 212, and 214A, are in a common component 108A, a unified interface for control and data signals is provided to configure these blocks before a given test is performed, and collect the data afterwards. In one embodiment, test configuration and execution are controlled by external processor 106A. In another embodiment, test configuration and execution are controlled by a finite state machine (FSM) within component 108A, or a separate processor embedded in component 108A.

In addition to controlling the test process in one embodiment, processor 106A also collects/stores the test data in memory 107A, and processes the stored test data to evaluate present and future link performance. In one form of the invention, the collection of data generated from each component self-test takes place through a serial interface, which is represented by communication links 202A–202E in FIG. 2. In another embodiment, communication links 202A–202E are implemented as a parallel interface. In one embodiment, each set of test results is time stamped by processor 106A, based on time data provided by clock 105A. In one embodiment, clock 105A is a global positioning system (GPS) clock. Each set of test results is uniquely identifiable by a set of parameters, which include in one embodiment the component 106A address, the name of the test, and the timestamp. Once the test data is gathered and stored, processor 106A sorts the test data according to the aforementioned parameters.

Figure 10:
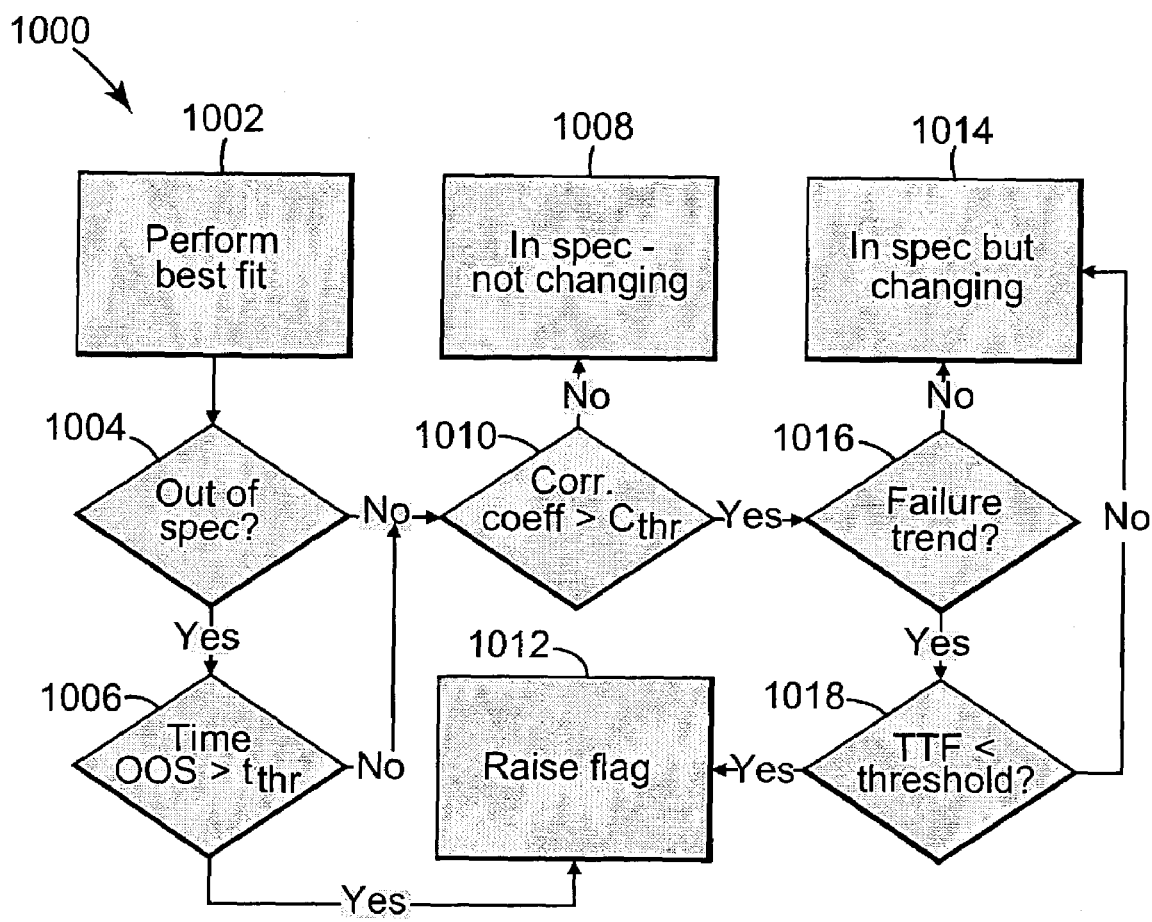
FIG. 10 is a flow diagram illustrating an alarm filtering method for providing present and future out-of-spec performance indications according to one embodiment of the present invention.

In one embodiment, after the test data is stored and sorted, processor 106A processes the test data and generates alarms. This step is referred to as "alarm filtering." FIG. 10 is a flow diagram illustrating an alarm filtering method 1000 for providing present and future out-of-spec performance indications according to one embodiment of the present invention. It will be understood by persons of ordinary skill in the art that the method illustrated in FIG. 10 is one embodiment of an alarm filtering method, and that other embodiments may use different alarm filtering techniques. In one embodiment, method 1000 is executed by processor 106A As shown in FIG. 10, a first step 1002 in method 1000 is to find the best fit of a mathematical function of time to the test data. In one embodiment, the best fit is determined by a conventional least squares method, such as described in Murray R. Spiegel, *Schaum's Outline Series/Probability and Statistics*, McGraw Hill Book Company, 1975. There are numerous types of equations that can be tried to find the best fit, the simplest of which are straight lines, a technique known as linear regression. If the data is known to not follow a linear trend, a polynomial regression may provide a more precise fit.

After performing the best fit in step 1002, in step 1004, processor 106A evaluates whether the gathered test data conforms to specification limits. In one embodiment, the determination of whether the test data conforms to specifications is performed before the best fit determination in step 1002. If the test data conforms to specifications, the process moves to step 1010, and if the test data does not conform to specifications (i.e., the test data is "out of spec"), the process moves to step 1006. It is unlikely that a network operator will want to see each out of spec (OOS) flag that occurs. For example, if a measured test parameter goes OOS once and then returns to normal, the network operator will not bother fixing a problem that no longer exists. Thus, in one embodiment, a minimum time threshold ($t_{thr}$) for OOS performance is set for each test parameter. In step 1006, processor 106A determines whether the time that the test parameter has been out of spec (Time OOS) is greater than the time threshold ($t_{thr}$) for the parameter. If Time OOS exceeds $t_{thr}$, processor 106A raises a flag (e.g., generates a fault indication indicating an existing fault) in step 1012. If Time OOS does not exceed $t_{thr}$, the process moves to step 1010.

In step 1010, a correlation coefficient, C, is calculated and compared to a threshold value ($C_{thr}$). The calculation of correlation coefficients is described in Murray R. Spiegel, *Schaum's Outline Series/Probability and Statistics*, McGraw Hill Book Company, 1975. The correlation coefficient, C, indicates how closely the best fit mathematical expression predicts the behavior of the test data. The values of the correlation coefficient, C, are between −1 and 1. The closer that the absolute value of C is to one, the better the fit predicts the data. If the fit does not clearly predict the data, any conclusions drawn by evaluating the fit at some time in the future are likely to be wrong. Thus, a minimum absolute value or threshold value ($C_{thr}$) is set for the correlation coefficient obtained from each measurement and its best fit. If the minimum threshold value ($C_{thr}$) is not attained (i.e., C is not greater than $C_{thr}$), then the performance is stable within the specified limits vs. time, and, as indicated by step 1008, the test data is within specifications and is not changing. If C is greater than the threshold, $C_{thr}$, the method moves to step 1016, where processor 106A determines if there is a failure trend. In step 1016, processor 106A determines whether the test data is moving in an improving direction or in a degrading direction. If the test data are improving (i.e., there is not a failure trend), then the process is finished, although the performance is unstable, as shown by step 1014, indicating that the test data are within specifications but are changing. If it is determined in step 1016 that the test data are degrading (i.e., there is a failure trend), in step 1018, a time to failure (TTF) is calculated and compared to a threshold time. In one embodiment, the time to failure is calculated by evaluating the best fit expression at different times and iteratively deducing when the best fit expression is equal to the specification limit. Iteratively solving the equation for time is not necessary for a linear fit but is useful for higher order polynomial fits. The time determined by evaluating the best fit expression minus the present time is the TTF. If the TTF is 10 years, the network operator is not likely to care. If the TTF is 10 days, a flag should probably be raised. Thus, an appropriate threshold time is set, such as a number of days, and in step 1018, processor 106A determines if the TTF is less than the threshold. If the TTF is less than the threshold, processor 106A raises a flag in step 1012 (e.g., generates a fault indication indicating a potential future fault). If the TTF is not less than the threshold, the method moves to step 1014, which indicates that the test data is within specifications, but is changing.

As described herein, one form of the present invention provides a built in self-test (BIST) system for measuring signal quality in an operating communications network for the purpose of predicting when a link will fail. In one embodiment, by measuring various system parameters, such as AC waveform properties (e.g., random and deterministic jitter, rise/fall times, pulse width, duty-cycle distortion, and inter-channel skew), signal amplitude, average electrical power, average optical power, supply voltage, and temperature, and collecting/processing these data over time, the system predicts when a link will fail for a given parameter, thereby enabling preventative maintenance to keep the network functioning.

One form of the invention gathers test data and assesses present link performance continuously. In one embodiment, a stored history of such test data is used to project future performance, thereby enabling a network operator to preventatively replace links whose future performance is deemed unreliable.

One embodiment of the invention provides a high precision system for measuring AC signal properties non-invasively, which has not previously been accomplished with existing in-situ network test systems. Since one form of the invention does not interrupt link operation, link-performance data can be gathered continuously. Such ongoing and precise collection of parametric data is important for predicting future performance.

The capabilities of one form of the invention include providing high-level visibility into the very detailed health of a network while dramatically simplifying maintenance of the network. In one embodiment, the ability to predict a failure through monitoring and diagnose a failure that has already occurred is greatly enhanced, which results in networks that can be operated more cost-effectively.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A monitoring system for a communications network, the monitoring system comprising:
    a set of components for transmitting and receiving data signals over the communications network, each component including a built-in self test system for performing tests within the component and outputting corresponding test results, each self-test system configured to non-invasively determine waveform characteristics of the data signals; and
    a set of processors, each processor coupled to a subset of the set of components, and configured to evaluate the test results output by the components coupled to the processor, each processor configured to associate identification information with each test result and detect and predict faults in the communications network based on the evaluation of the test results.

2. The monitoring system of claim 1, wherein the self-test system of each component further comprises:
    a stimuli generator for generating start signals and stop signals based on the data signals; and
    a time interval analyzer for determining the waveform characteristics of the data signals based on the generated start and stop signals.

3. The monitoring system of claim 2, wherein the waveform characteristics include at least one of jitter, pulse width, rise and fall times, and inter-channel skew.

4. The monitoring system of claim 1, wherein the self-test system of each component further comprises:

a signal amplitude measurement circuit for measuring an amplitude of the data signals;

a power supply measurement circuit for measuring power generated by a power supply of the component; and a temperature sensor for measuring temperature within the component.

5. The monitoring system of claim 4, wherein the self-test system of each component further comprises:

a first analog-to-digital converter coupled to the signal amplitude measurement circuit for generating digital signal amplitude data;

a second analog-to-digital converter coupled to the power supply measurement circuit for generating digital power supply data; and a third analog-to-digital converter coupled to the temperature sensor for generating temperature data.

6. The monitoring system of claim 1, wherein the self-test system of each component further comprises:

an optical power detector for measuring optical power of the data signals; and an analog-to-digital converter coupled to the optical power detector for generating digital optical power data.

7. The monitoring system of claim 1, wherein each processor is configured to associate a time stamp and a component identifier with each set of test results output by the components coupled to the processor.

8. A method for non-invasively detecting and predicting faults in a communications network, the method comprising:

providing a set of components for transmitting and receiving data signals over the communications network;

non-invasively performing parametric tests within each component and outputting corresponding test results;

associating identification information with each test result;

generating a first fault indication indicating an existing fault if a test result is outside of predetermined specification limits;

identifying whether a failure trend exists based on the test results; and generating a second fault indication indicating a potential future fault if a failure trend exists.

9. The method of claim 8, and further comprising:

identifying a test result that is outside of predetermined specification limits;

calculating a time value for the identified test result indicating an amount of time that the identified test result has been outside of the specification limits; and comparing the calculated time value with a threshold time value.

10. The method of claim 9, wherein the first fault indication is generated only if the calculated time value exceeds the threshold time value.

11. The method of claim 8, and further comprising:

identifying a mathematical function of time that provides a best fit representation of the test results;

determining whether the test results are degrading over time, thereby identifying whether a failure trend exists; and calculating a time to failure based on the mathematical function and the predetermined specification limits.

12. The method of claim 11, and further comprising:

comparing the calculated time to failure to a threshold time; and wherein the second fault indication is generated only if the calculated time to failure is less than the threshold time.

13. The method of claim 11, and further comprising:

calculating a correlation coefficient that is indicative of the accuracy of the mathematical function to predict future values of the test results; and comparing the calculated correlation coefficient to a minimum threshold value.

14. The method of claim 13, wherein the step of identifying whether a failure trend exists is performed only if the calculated correlation coefficient exceeds the minimum threshold value.

15. The method of claim 8, wherein the identification information includes a test name, a time stamp, and a component identifier that identifies the component that output the test result.

16. The method of claim 8, and further comprising:

sorting the test results based on the identification information associated with each test result.

17. A built-in self-test system for a component that transmits or receives data signals over a communications network, the system comprising:

a stimuli generator for generating stimuli signals based on the data signals, the stimuli generator including a set of flip-flops for generating stimuli signals based on rising and falling edges of the data signals, and including a set of comparators for generating stimuli signals based on a magnitude of the data signals;

a time interval analyzer for non-invasively determining waveform characteristics of the data signals based on the generated stimuli signals;

a set of monitoring circuits for monitoring operating characteristics of the component; and a controller for controlling the time interval analyzer and the set of monitoring circuits to continually generate test results.

18. The built-in self-test system of claim 17, wherein the waveform characteristics include at least one of jitter, pulse width, rise and fall times, and inter-channel skew.

19. The built-in self-test system of claim 18, wherein the set of monitoring circuits include a temperature sensing circuit and a power supply monitoring circuit.

* * * * *